(12) United States Patent
Weiss et al.

(10) Patent No.: US 9,458,396 B2
(45) Date of Patent: Oct. 4, 2016

(54) PROCESS FOR CONVERSION OF FEEDSTOCKS OBTAINED FROM RENEWABLE SOURCES BASED ON MARINE FUELS

(71) Applicant: IFP Energies nouvelles, Rueil-Malmaison (FR)

(72) Inventors: Wilfried Weiss, Valencin (FR); Thierry Chapus, Lyons (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 378 days.

(21) Appl. No.: 14/106,889

(22) Filed: Dec. 16, 2013

(65) Prior Publication Data
US 2014/0291200 A1    Oct. 2, 2014

(30) Foreign Application Priority Data
Dec. 19, 2012  (FR) ...................... 12 03491

(51) Int. Cl.
  *C10G 65/04*   (2006.01)
  *C10L 1/08*    (2006.01)
  *C10G 3/00*    (2006.01)

(52) U.S. Cl.
  CPC .............. *C10G 65/043* (2013.01); *C10G 3/47* (2013.01); *C10G 3/52* (2013.01); *C10L 1/08* (2013.01);
  (Continued)

(58) Field of Classification Search
  CPC ........ C10G 65/043; C10G 3/52; C10G 3/47; C10G 2300/1011; C10G 2400/06; C10G 2300/4081; C10G 2300/202; C10G 2300/1014; C10G 2300/1018; C10L 1/08; Y02P 30/20; Y02E 50/13
  See application file for complete search history.

(56) References Cited

U.S. PATENT DOCUMENTS

| 8,282,815 B2 | 10/2012 | Bouchy et al. |
| 2008/0161615 A1* | 7/2008 | Chapus ................. C10G 45/08 585/240 |

(Continued)

FOREIGN PATENT DOCUMENTS

| FR | 2932812 A1 | 12/2009 |
| FR | 2951190 A1 | 4/2011 |

(Continued)

OTHER PUBLICATIONS

Search Report from Priority Patent Application No. FR 12/03491 dated Apr. 5, 2013.

*Primary Examiner* — Randy Boyer
*Assistant Examiner* — Juan Valencia
(74) *Attorney, Agent, or Firm* — Millen White Zelano & Branigan, P.C.

(57) ABSTRACT

The invention relates to a process for the production of diesel fuel bases comprising a sulfur content that is less than 100 ppm, starting from a feedstock that is obtained from a renewable source, comprising the following stages:
  a) A stage for bringing the feedstock into contact with a fixed-bed hydrotreatment catalyst for producing an effluent that comprises a gaseous fraction comprising hydrogen and a hydrocarbon-based liquid fraction,
  d) A stage for bringing into contact at least one portion of the hydrocarbon-based liquid fraction in the presence of a selective hydroisomerization catalyst in a fixed bed,
  e) A stage for separating the effluent that is obtained from stage d) into a gaseous fraction that comprises hydrogen and at least one diesel-fuel-based fraction.

10 Claims, 3 Drawing Sheets

(52) U.S. Cl.
CPC . *C10G 2300/1011* (2013.01); *C10G 2300/202* (2013.01); *C10G 2300/4081* (2013.01); *C10G 2400/06* (2013.01); *Y02E 50/13* (2013.01); *Y02P 30/20* (2015.11)

(56) References Cited

U.S. PATENT DOCUMENTS

| | | |
|---|---|---|
| 2009/0326290 A1 | 12/2009 | Bouchy et al. |
| 2010/0000908 A1 | 1/2010 | Markkanen et al. |
| 2011/0087059 A1 | 4/2011 | Simon et al. |
| 2011/0108460 A1 | 5/2011 | Simon et al. |
| 2011/0166396 A1 | 7/2011 | Egeberg et al. |
| 2012/0088943 A1 | 4/2012 | Knuuttila et al. |
| 2012/0165581 A1 | 6/2012 | Dupassieux et al. |

FOREIGN PATENT DOCUMENTS

| | | |
|---|---|---|
| FR | 2952378 A1 | 5/2011 |
| FR | 2969642 A1 | 6/2012 |

* cited by examiner

PROCESS FOR CONVERSION OF FEEDSTOCKS OBTAINED FROM RENEWABLE SOURCES BASED ON MARINE FUELS

FIELD OF THE INVENTION

This invention relates to a process for treatment of feedstocks obtained from renewable sources. It relates more particularly to a process for treatment of feedstocks obtained from renewable sources for the production of diesel fuel bases with sulfur contents of less than 100 ppm.

This invention also relates to the use of compositions comprising at least said diesel fuel bases as marine fuels and optionally fuel for ground and/or air transport, or as a bunker fuel-oil-type marine fuel fluxing agent.

PRIOR ART

Whereas worldwide industry has instituted strict limits on the sulfur contents contained in the fuel bases (gasoline, diesel fuels) in recent decades, the sulfur content in marine fuels has not been very restrictive to date. Actually, the marine fuels currently on the market contain up to 3.5% by weight of sulfur. The result is that the ships have become the primary sulfur dioxide ($SO_2$) emission source.

So as to lower these emissions, the International Maritime Organization submitted recommendations (Attachment VI of the MARPOL Agreement) in terms of specifications relative to the marine fuels. These recommendations are rejected in the 2012 version of the standard ISO 8217. From now on, the specification relative to sulfur relates to sulfur oxide ($SO_x$) emissions and is reflected by a recommendation as regards equivalent sulfur content of less than or equal to 0.5% by weight by 2020-2025. There are also more restrictive recommendations for the Sulfur Emission Control Zones that are generally coastal zones where the equivalent sulfur content should be less than or equal to 0.1% by weight as soon as 2015.

Maritime transport is also responsible for greenhouse gas emissions and in particular carbon dioxide ($CO_2$).

Marine fuels exist according to several grades distributed into two groups.

The first group constitutes the distillate-type marine fuels, since they essentially consist of atmospheric distillate-type fractions (kerosene and diesel fuel), or vacuum distillate-type fractions (VGO or vacuum gas oil according to English terminology). This first group comprises the grades DMA, DMB, DMX, DMZ according to the standard ISO 8217, also called MGO (marine gas oil) or MDO (marine diesel oil). The MGO is quite close to a highway diesel-type fuel in terms of distillation interval but it is, however, very different for other properties such as the cetane number or the sulfur content, with these specifications currently being much more stringent for highway diesel fuel.

The second group of marine fuels constitutes the residual-type bunker fuel oils. The latter are more viscous than the distillate-type marine fuels. Furthermore, they generally consist of vacuum residues and/or atmospheric residues and generally incorporate fractions that are lighter and not very viscous such as atmospheric distillates or vacuum distillates in such a way as to obtain, after mixing, a bunker fuel oil with the viscosity that is required by the specification of the targeted bunker fuel oil grade. These bases that are not very viscous—called fluxing agents or cutter stocks according to English terminology—can be diesel fuel fractions or kerosenes, generally obtained by direct distillation or obtained from conversion processes such as catalytic cracking or coking after atmospheric distillation and/or vacuum distillation. These fluxing agents can also undergo refining stages making it possible to improve the properties thereof and the final properties of the mixture. It is possible, for example, to hydrotreat a diesel fuel for the purpose of using it as a fluxing agent with a low sulfur content. Upon leaving catalytic cracking, it is possible, for example, to use as fluxing agents the following fractions according to English terminology: LCO (Light Cycle Oil), HCO (Heavy Cycle Oil), or else the slurry fraction.

An approach that is generally used in the field consists in integrating in the refining process new products of plant origin, obtained from the conversion of lignocellulosic biomass or obtained from the production of vegetable oils or animal fats. However, this approach—although making it possible to reduce greenhouse gases, in particular carbon dioxide ($CO_2$)—suffers from a consumption of hydrogen that is still too high in the processes implemented and/or still inadequate yields of bases.

Thus, the patent application No. EP 1 681337 A describes the transformation of feedstocks obtained from renewable sources by decarboxylation for producing middle distillates. The process comprises an optional pretreatment stage followed by an isomerization stage using a catalyst containing a molecular sieve selected from among SAPO-11, SAPO-41, ZSM-22, ferrierite or ZSM-23, and a group VIII metal selected from among palladium, platinum and nickel, at a temperature of between 200 and 500° C., and at a pressure of between 2 and 15 MPa, with the catalysts that are used being metal catalysts. The yields of diesel fuel bases that are obtained according to this process are not maximized, however.

The U.S. Pat. No. 4,992,605 describes a process for the production of bases for the diesel fuel pool produced from the direct transformation of vegetable oils (canola, palm, soybean, sunflower) or lignocellulosic biomass of saturated hydrocarbons after hydrotreatment or hydrorefining of these products in the presence of a catalyst based on cobalt and molybdenum at a temperature of between 350 and 450° C. and at a pressure of between approximately 4.8 MPa and 15.2 MPa. These conditions make it possible to obtain products with a high cetane number. The pro-cetane additives that are thus obtained are mixed with diesel fuel at contents of 5 to 30% by volume. However, as a major drawback, this process has a high hydrogen consumption due to reactions of methanization or conversion of carbon monoxide into vapor (water-gas shift reaction according to English terminology). In addition, the oxygen that is contained in the triglycerides is generally decomposed by hydrogenation-deoxygenation in the presence of hydrotreatment catalyst, which is hydrogen-intensive.

The patent application EP 1 741 768 describes a process comprising a hydrotreatment stage followed by a hydroisomerization stage so as to improve the cold properties of linear paraffins that are obtained. EP 1 741 768 describes a dilution of the feedstock during the hydrotreatment stage by means of a diluting agent making it possible to reduce the hydrotreatment temperature. The catalysts that are used in the hydroisomerization stage are bifunctional catalysts and consist of a metallic active phase comprising a group VIII metal selected from among palladium, platinum and nickel, dispersed on a molecular-sieve-type acid substrate selected from among SAPO-11, SAPO-41, ZSM-22, ferrierite or ZSM-23, with said process being performed at a temperature of between 200 and 500° C., and at a pressure of between 2 and 15 MPa. Nevertheless, the use of this type of solid brings about a loss of yield of middle distillates for the production of diesel fuel.

The hydrocarbons that are produced during the conversion of renewable source feedstocks are characterized by:

a/ A number of carbon atoms equal to that of the initial fatty acid chains if the mechanism is a mechanism for hydrogenation of the carboxylic group into an alkyl group, b/ A hydrocarbon chain that has one carbon atom less than the starting fatty acid chains, if the mechanism involved is a decarboxylation/decarbonylation mechanism, c/ A degree of branching of the hydrocarbons that is adjusted in such a way as to obtain cold strength properties and a cetane number that are compatible with the standards in force for diesel fuel.

It is known from the state of the art that the two means of transformation a/ and b/ generally coexist and produce a hydrogen consumption, in particular for the means a/, or impact the yield of desired diesel fuel bases while producing $CO_2$, in particular the means b/.

There is therefore still an advantage in developing processes making it possible to produce—by means of a reduced hydrogen consumption and with an improved yield—diesel fuel bases, and diesel fuel bases that contain sulfur with contents of less than 100 ppm and that emit less sulfur dioxide ($SO_2$) for their use as marine fuels and optionally fuel for ground and/or air transport.

The purpose of the process that is described in this invention is to maximize the diesel fuel yield and to orient the selectivity of the conversion of feedstocks obtained from renewable sources for the benefit of the hydrogenation mechanism described in a/, while seeking to limit hydrogen consumption to the bare minimum and in particular the consumption of hydrogen that results from undesirable reactions.

SUMMARY DESCRIPTION OF THE INVENTION

This invention relates to a process for the production of diesel fuel bases comprising a sulfur content of less than 100 ppm from a feedstock that is obtained from a renewable source, comprising the following stages:

a) A stage for bringing the feedstock into contact with a fixed-bed hydrotreatment catalyst, at a temperature of between 200 and 450° C., at a pressure of between 1 MPa and 10 MPa, at an hourly volumetric flow rate of between $0.1\ h^{-1}$ and $10\ h^{-1}$ and in the presence of a total quantity of hydrogen mixed with the feedstock such that the hydrogen/feedstock ratio is between 150 and 750 $Nm^3$ of hydrogen/$m^3$ of feedstock for producing an effluent that comprises a gaseous fraction comprising hydrogen and a hydrocarbon-based liquid fraction, d) A stage for bringing into contact at least one portion of the hydrocarbon-based liquid fraction in the presence of a selective hydroisomerization catalyst in a fixed bed, said catalyst comprising at least one group VIII metal and/or at least group VIB metal, said stage d) being carried out at a temperature of between 300 and 380° C., at a pressure of between 3 MPa and 7 MPa, at an hourly volumetric flow rate of between 0.5 and 5 $h^{-1}$, and in the presence of a total quantity of hydrogen mixed with said hydrocarbon-based liquid fraction such that the hydrogen/hydrocarbon-based liquid fraction ratio is between 70 and 1,000 $Nm^3/m^3$, e) A stage for separating the effluent that is obtained from stage d) into a gaseous fraction that comprises hydrogen and at least one diesel-fuel-based fraction, and in which the hydrogen that is used in stage a) and/or in stage d) is obtained at least in part from the separated gaseous fraction of stage e).

Advantageously, at least one portion of the effluent that is obtained from stage a) is subjected to a stage b) for separation into a gaseous fraction comprising hydrogen and a hydrocarbon-based liquid fraction and in which the hydrogen that is used in stage a) and/or in stage d) is obtained at least in part from the separated gaseous fraction of stage b).

Advantageously, the separated hydrocarbon-based liquid fraction of stage b) is subjected to a stage c) for elimination of hydrogen sulfide that is dissolved in said hydrocarbon-based liquid fraction before stage d).

Advantageously, the hydrotreatment catalyst and/or the hydroisomerization catalyst comprise sulfurized metals. Preferably, a making-up with sulfur-containing compound, which by thermal decomposition produces hydrogen sulfide, is added to all of the liquid and/or gaseous streams upstream from stages a) and/or d).

Advantageously, when the hydroisomerization catalyst that is used in stage d) comprises a noble metal, stage d) is implemented at least in part on the hydrocarbon-based liquid fraction that is obtained from stage c), and the gaseous fractions that are obtained at least in part from the separated gaseous fraction of stage b) and/or stage e) and sent back to stage d) are subjected in advance to a stage for elimination of hydrogen sulfide.

This invention also relates to the use of diesel fuel bases obtained according to the process of the invention as marine fuels and optionally fuel for ground and/or air transport, or as a fluxing agent of marine fuels of the residual-type bunker-fuel-oil type.

This invention makes it possible to produce diesel fuel bases for marine fuels, in particular diesel fuel bases obtained from renewable sources with contents and whose sulfur contents are less than 100 ppm, preferably less than 80 ppm, and in a more preferred manner less than 10 ppm, complying with the recommendations of the MARPOL agreement.

Said diesel fuel bases can also be incorporated with variable contents in a composition for distillate-type marine fuels or in the residual-type bunker-fuel-oil-type marine fuels as fluxing agents. For the distillate-type fuels, it is possible to incorporate between 1 and 99% of diesel fuel base according to the invention. For the residual-type fuels, it is possible to incorporate between 1 to 95%, preferably from 1 to 80%, and in a more preferred manner from 1 to 50%, of a diesel fuel base according to the invention for sufficiently lowering the viscosity of the residue of fossil origin and to meet the viscosity specification.

FIGS. 1 to 3 illustrate the invention in a non-limiting manner.

DETAILED DESCRIPTION OF THE INVENTION

The Feedstock

Figure 1:
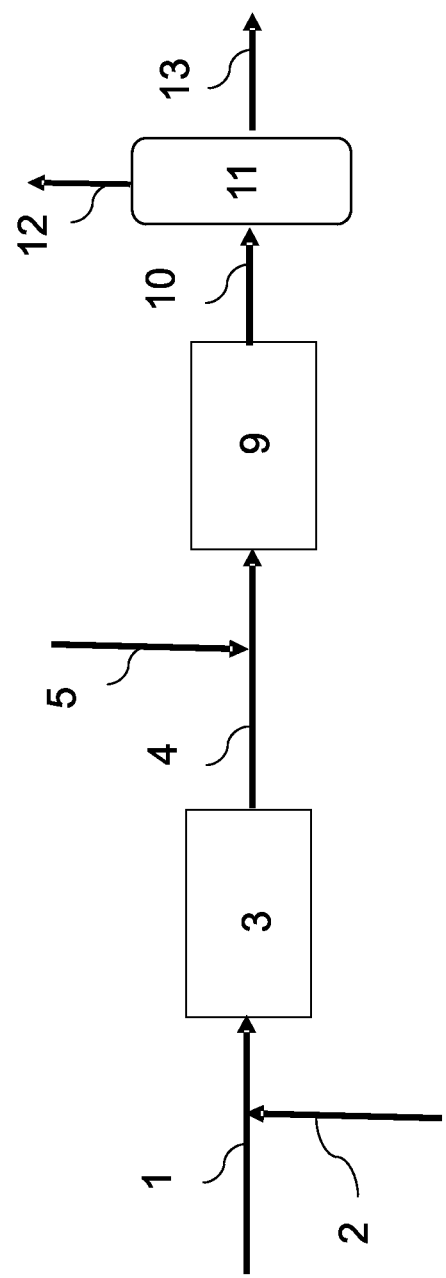
FIG. 1 illustrates the implementation of the process according to a first embodiment.

The renewable source feedstocks according to the invention advantageously comprise oils and fats of plant or animal origin or the mixture thereof, such oils containing triglycerides and/or fatty acids and/or esters whose fatty chains contain a number of carbon atoms of between 8 and 25. Said vegetable oils can be raw or at least refined and can come from the following plants: canola, sunflower, soybean, palm, palm kernel, olive, coconut, jatropha, with this list not being limiting. Said oils can also be algal or fish oils. Among the possible fats, it is possible to cite all of the animal fats such as lard or fats composed of food industry residues or obtained from catering industries.

Said oils according to the invention have in particular densities at 15° C. of between 850 and 970 kg/m$^3$ and kinematic viscosities at 40° C. of between 20 and 400 mm$^2$/s, preferably between 30 and 50 mm$^2$/s.

The feedstocks according to the invention contain sulfur and nitrogen contents that are less than 500 ppm and aromatic compound contents that are less than 5% by weight.

Pretreatment of the Feedstock

In an optional manner, prior to stage a) of the process according to the invention, the feedstock can undergo a pretreatment or pre-refining stage in such a way as to eliminate, by a suitable treatment, contaminants such as metals, like alkaline compounds, for example, on ion-exchange resins, alkaline-earth compounds, and phosphorus. Suitable treatments can be, for example, heat treatments and/or chemical treatments that are well known to one skilled in the art.

When a pretreatment of the feedstock is implemented, it consists of a mild prehydrogenation of said feedstock in such a way as to prevent the secondary reactions of double bonds. The mild prehydrogenation is advantageously performed at a temperature of between 50 and 400° C. and at a hydrogen pressure of between 0.1 and 10 MPa and in a preferred manner at a temperature of between 150 and 200° C. The prehydrogenation catalyst advantageously comprises metals of group(s) VIII and/or VIB, and in a preferred manner, the prehydrogenation catalyst is a catalyst based on palladium, nickel platinum, nickel and molybdenum or based on cobalt and molybdenum, supported by an alumina substrate and/or silica substrate. The metals of the catalysts that are used in the pretreatment stage of the process according to the invention are metal sulfides or metal phases, and preferably metal phases.

Stage a): Hydrotreatment of the Feedstock Obtained from a Renewable Source

In accordance with stage a) of the process according to the invention, the feedstock, optionally pretreated, is brought into contact with a hydrotreatment catalyst at a temperature of between 200 and 450° C., preferably between 220 and 350° C., in a more preferred manner between 220 and 320° C., and in an even more preferred manner between 220 and 310° C.; at a pressure of between 1 MPa and 10 MPa, in a preferred manner between 1 MPa and 6 MPa, and in an even more preferred manner between 3 MPa and 5.5 MPa; at an hourly volumetric flow rate (volume of feedstock/volume of catalyst) of between 0.1 h$^{-1}$ and 10 h$^{-1}$, in a preferred manner between 0.2 and 5 h$^{-1}$, and in an even more preferred manner between 0.5 and 3 h$^{-1}$.

The feedstock is brought into contact with the catalyst in the presence of hydrogen. The total quantity of hydrogen mixed with the feedstock is such that the hydrogen/feedstock ratio is between 150 and 750 Nm$^3$ of hydrogen/m$^3$ of feedstock, in a very preferred manner between 150 and 700 Nm$^3$ of hydrogen/m$^3$ of feedstock, in an even more preferred manner between 150 and 650 Nm$^3$ of hydrogen/m$^3$ of feedstock, and in an even more preferred manner between 150 and 600 Nm$^3$ of hydrogen/m$^3$ of feedstock. This therefore corresponds to an amount of hydrogen added to the feedstock that is present of at least generally 0.5% by weight of hydrogen relative to the feedstock.

In stage a) of the process according to the invention, at least one fixed bed of hydrotreatment catalyst comprising a hydrogenating-dehydrogenating function and a substrate is used. Preferably, said substrate is selected from the group that is formed by alumina, silica, silica-aluminas, magnesia, clays or the mixture of at least two of these minerals. The substrate can also comprise other compounds such as oxides selected from the group that is formed by boron oxide, zirconia, titanium oxide, and phosphoric anhydride. In a preferred manner, an alumina substrate is used, and in a very preferred manner, η-, δ-, or γ-alumina is used.

Said hydrogenating function of the hydrotreatment catalyst that is used in stage a) of the process according to the invention is advantageously ensured by at least one metal of group VIII and/or of group VIB of the periodic table. Advantageously, the group VIII metals are selected from the group that is formed by nickel and/or cobalt, and the group VIB metals are selected from the group that is formed by molybdenum and/or tungsten. By way of example, the hydrotreatment catalyst according to the invention comprises between 0.5 and 10% by weight of nickel oxide (NiO), preferably between 1 and 5% by weight of nickel oxide, and between 1 and 30% by weight of molybdenum oxide (MoO$_3$), preferably between 5 and 25% by weight of molybdenum oxide on an amorphous mineral substrate, with the percentages being expressed in terms of % by weight relative to the total mass of the catalyst.

The total content of metal oxides of groups VIB and VIII in the hydrotreatment catalyst used in stage a) is advantageously between 5 and 40% by weight and in a preferred manner between 6 and 30% by weight relative to the total mass of the catalyst.

The ratio by weight expressed in terms of metal oxide between group VIB metal (or metals) vs. group VIII metal (or metals) is advantageously between 20 and 1, and in a preferred manner between 10 and 2.

Said catalyst that is used in stage a) of the process according to the invention is advantageously characterized by a strong hydrogenating power in such a way as to orient as much as possible the selectivity of the reaction toward a hydrogenation preserving the number of carbon atoms of the fatty chains, so as to maximize the yield of hydrocarbons entering the distillation domain of the diesel fuels. This is why, in a preferred manner, the procedure is performed at a relatively low temperature.

Maximizing the hydrogenating function also makes it possible to limit the polymerization and/or condensation reactions leading to the formation of coke that would degrade the stability of catalytic performances. In a preferred way, an Ni- or NiMo-type catalyst is used.

Said hydrotreatment catalyst that is used in stage a) of the process according to the invention can also advantageously contain an element such as phosphorus and/or boron. This element can be introduced on a substrate. It is also possible to deposit silicon on the substrate, by itself or with phosphorus and/or boron and/or fluorine.

The content by weight of oxide of said element is advantageously at least 0.001% and is advantageously less than 20% and in a preferred manner less than 10%.

The metals of the hydrotreatment catalysts that are used in stage a) of the process according to the invention are advantageously metal sulfides or metal phases.

Relative to active catalysts in sulfurized form, and treated raw feedstocks in general having limited sulfur contents (less than 500 ppm by weight), it is suitable to add to all of the feedstock streams, preferably to the separated gaseous fraction of stage b) and/or of stage e) and sent back into stage a) and/or into stage d), a sulfur-containing compound such as dimethyl disulfide (DMDS), which under the temperature conditions of the hydrotreatment section will decompose into $H_2S$ and into methane. This device makes it possible to preserve, in their sulfide form, the hydrotreatment catalysts that are used in this process and thus to maintain sufficient catalytic activity throughout the cycle. The recommended injected DMDS contents are between 10 and 50 ppm by equivalent weight of sulfur relative to the feedstock.

A preferred metal hydrotreatment catalyst used in stage a) of the process according to the invention comprises a nickel content of between 20% and 80% by weight and in a preferred manner between 55% and 65% by weight. The substrate of said catalyst is advantageously selected from the group that is formed by alumina, magnesium oxide, and silica, and in a preferred manner, the substrate is alumina.

Stage a) of the process according to the invention can be implemented either in a simultaneous manner with a single catalyst or several different catalysts or in an iterative manner with a single catalyst or several different catalysts. This stage can be carried out in one or more reactors with one or more catalytic beds and preferably with a downward liquid current.

The exothermy of reactions during hydrotreatment is limited by all methods that are known to one skilled in the art: for example, the recycling of liquid products obtained from hydrotreatment stage a) and/or hydroisomerization stage d), the quenching by recycling hydrogen or make-up hydrogen, etc.

Stage b): Separation of the Hydrotreated Effluent Obtained from Stage a)

In accordance with stage b) of the process according to the invention, the effluent that is obtained from stage a) can be at least in part, preferably completely, subjected to one or more stages of separations for obtaining at least one gaseous fraction preferably comprising, for the most part, hydrogen and at least one liquid fraction comprising at least one hydrocarbon base.

The object of said separation stage(s) is to separate the gases from the liquid and in particular to recover hydrogen-rich gases.

Stage c) For Elimination of Dissolved Hydrogen Sulfide $H_2S$ in the Hydrocarbon-Based Liquid Fraction The separation stage b) can be followed by a stage for elimination of dissolved hydrogen sulfide ($H_2S$) in the separated hydrocarbon-based liquid fraction of said stage b). This optional stage for removal of $H_2S$ has as its object to eliminate at least in part the $H_2S$ that is produced during the hydrotreatment stage and that is still dissolved in the separated liquid fraction of stage b). The elimination of $H_2S$ can be done by all of the methods and techniques known to one skilled in the art, for example by vapor stripping, by hydrogen stripping, by passage over a collection mass . . . .

Stage d): Hydroisomerization of the Liquid Hydrocarbon Base

In accordance with the invention, at least a portion, preferably all, of the liquid hydrocarbon-based liquid fraction contained in the effluent obtained from stage a) is subjected to a hydroisomerization stage in the presence of a selective hydroisomerization catalyst.

When stage b) for separation of the effluent obtained from stage a) is implemented, the hydroisomerization stage d) is carried out over at least a portion, preferably all, of the liquid hydrocarbon-based liquid fraction that is obtained at the end of stage b), in the presence of a selective hydroisomerization catalyst.

When stage c) for elimination of hydrogen sulfide is implemented, hydroisomerization stage d) is carried out over at least a portion, preferably all, of the liquid hydrocarbon-based liquid fraction that is obtained at the end of stage c) for elimination of hydrogen sulfide, in the presence of a selective hydroisomerization catalyst. The hydroisomerization catalysts that are used in stage d) of the process according to the invention are advantageously of the bifunctional type, i.e., they have a hydrogenating/dehydrogenating function and a hydroisomerizing function.

In accordance with stage d) of the process according to the invention, the hydroisomerization catalyst comprises at least one metal of group VIII and/or at least one metal of group VIB as a hydrogenating/dehydrogenating function and at least one hydroisomerizing function.

Said hydroisomerization catalyst advantageously comprises at least one group VIII metal and/or at least one group VIB metal as a hydrogenating/dehydrogenating function and at least one molecular sieve or an amorphous mineral substrate as a hydroisomerizing function.

In a variant of the process according to the invention, the hydroisomerization catalyst comprises at least one group VIII noble metal, preferably selected from among platinum or palladium, active in their reduced form.

The group VIB metal is preferably selected from among molybdenum or tungsten. This metal can therefore be either in combination with at least one group VIII noble metal, preferably selected from among platinum or palladium, active in their reduced form, or in combination with at least one group VIII non-noble metal, preferably selected from among nickel and cobalt, preferably used in their sulfurized form.

In the case where the hydroisomerization catalyst comprises at least one group VIII noble metal, the total noble metal content of the hydroisomerization catalyst that is used in stage d) of the process according to the invention is advantageously between 0.01 and 5% by weight relative to the finished catalyst, in a preferred manner between 0.1 and 4% by weight, and in a very preferred manner between 0.2 and 2% by weight.

When the hydroisomerization catalyst comprises at least one active group VIII metal in sulfide form, it may be advantageous to add—to all of the liquid and/or gaseous streams upstream from stages a) and/or d)—a sulfur-containing compound such as dimethyl disulfide (DMDS), which under the conditions of the hydrotreatment section will decompose into $H_2S$. This device makes it possible to preserve the hydrotreatment catalysts used in this process in their sulfide form and thus to maintain a sufficient catalytic activity throughout the cycle. The recommended injected DMDS contents are between 10 and 50 ppm by equivalent weight of sulfur relative to the feedstock.

In the case where the hydroisomerization catalyst comprises at least one group VIB metal in combination with at least one group VIII non-noble metal, the group VIB metal content of the hydroisomerization catalyst that is used in stage d) of the process according to the invention is advantageously, in oxide equivalent, between 5 and 40% by weight relative to the finished catalyst, in a preferred manner between 10 and 35% by weight, and in a very preferred manner between 15 and 30% by weight, and the group VIII metal content of said catalyst is advantageously, in oxide equivalent, between 0.5 and 10% by weight relative to the finished catalyst, in a preferred manner between 1 and 8% by weight, and in a very preferred manner between 1.5 and 6% by weight.

The metal hydrogenating/dehydrogenating function can advantageously be introduced in said catalyst by any method that is known to one skilled in the art, such as, for example, co-mixing, dry impregnation, and exchange impregnation.

According to an embodiment of the process according to the invention, said hydroisomerization catalyst comprises at least one amorphous mineral substrate as a hydroisomerizing function, with said amorphous mineral substrate being selected from among the fluorine- and/or chlorine-doped aluminas, the silica-aluminas, and the siliceous aluminas, and in a preferred manner, the silica-aluminas. In a very preferred manner, the catalyst comprises NiW on silica-alumina.

In a variant according to the invention, the hydroisomerization catalyst comprises at least one one-dimensional 10 MR zeolitic molecular sieve as a hydroisomerizing function.

The zeolitic molecular sieves are defined in the classification "Atlas of Zeolite Structure Types," W. M. Meier, D. H. Olson, and Ch. Baerlocher, 5$^{th}$ Revised Edition, 2001, Elsevier, to which this application also refers. The y zeolites are classified according to the size of their pore openings or channels.

The one-dimensional 10 MR zeolitic molecular sieves have pores or channels whose openings are defined by a ring with 10 oxygen atoms (opening of 10 MR). The channels of the zeolitic molecular sieve having an opening of 10 MR are advantageously non-interconnected one-dimensional channels that empty directly onto the outside of said zeolite. The one-dimensional 10 MR zeolitic molecular sieves that are present in said hydroisomerization catalyst advantageously comprise silicon and at least one element T that is selected from the group that is formed by aluminum, iron, gallium, phosphorus, and boron, preferably aluminum. The Si/Al ratios of the zeolites described above are advantageously those obtained with synthesis or else obtained after post-synthesis dealuminification treatments that are well known to one skilled in the art, such as, and in a non-exhaustive manner, hydrothermal treatments that may or may not be followed by acid attacks or else also direct acid attacks by solutions of mineral or organic acids. They are preferably virtually totally in acid form, i.e., the atomic ratio between the monovalent compensation cation (for example, sodium) and the element T inserted in the crystalline network of the solid is advantageously less than 0.1, preferably less than 0.05, and in a very preferred manner less than 0.01. Thus, the zeolites entering into the composition of said selective hydroisomerization catalyst are advantageously calcined and exchanged via at least one treatment by a solution of at least one ammonium salt in such a way as to obtain the ammonium form of zeolites that once calcined lead to the acid form of said zeolites.

Said one-dimensional 10 MR zeolitic molecular sieve of said hydroisomerization catalyst can be selected from among the TON-structural-type zeolitic molecular sieves, such as NU-10, EUO, selected from among EU-1 and ZSM-50, taken by themselves or in a mixture, or the zeolitic molecular sieves ZSM-48, ZBM-30, IZM-1, COK-7, EU-2 and EU-11, taken by themselves or in a mixture.

Said one-dimensional 10 MR zeolitic molecular sieve can also be selected from among the zeolitic molecular sieves ZSM-48, ZBM-30, IZM-1 and COK-7, taken by themselves or in a mixture. In a preferred manner, said one-dimensional 10 MR zeolitic molecular sieve is selected from among the zeolitic molecular sieves ZSM-48 and ZBM-30, taken by themselves or in a mixture.

In an advantageous manner, said one-dimensional 10 MR zeolitic molecular sieve is the ZBM-30 or ZBM-30 that is synthesized with the organic structuring agent triethylene tetramine.

The zeolite ZBM-30 is described in the patent EP-A-46 504, and the zeolite COK-7 is described in the patent applications EP 1 702 888 A1 or FR 2 882 744 A1. The zeolite IZM-1 is described in the patent application FR-A-2 911 866. The TON-structural-type zeolites are described in the work "Atlas of Zeolite Structure Types," W. M. Meier, D. H. Olson and Ch. Baerlocher, 5$^{th}$ Revised Edition, 2001, Elsevier. The TON-structural-type zeolite is described in the work "Atlas of Zeolite Structure Types," cited above, and relative to the zeolite NU-10, in the patents EP-65400 and EP-77624.

The one-dimensional 10 MR zeolitic molecular sieve content is advantageously between 5 and 95% by weight, preferably between 10 and 90% by weight, in a more preferred manner between 15 and 85% by weight, and in a very preferred manner between 20 and 80% by weight relative to the finished catalyst.

Preferably, said hydroisomerization catalyst also comprises a binder that consists of a porous mineral matrix. Said binder can advantageously be used during the shaping stage of said hydroisomerization catalyst.

Preferably, the shaping is carried out with a binder that consists of a matrix that contains alumina, in all of its forms known to one skilled in the art, and in a very preferred manner with a matrix containing gamma-alumina.

The hydroisomerization catalysts that are obtained are shaped in the form of grains of different shapes and sizes. They are used in general in the form of cylindrical or multilobed—such as bilobed, trilobed, multilobed of straight or twisted shape—extrudates but can optionally be manufactured and used in the form of crushed powders, tablets, rings, balls, and wheels. Techniques other than extrusion, such as pelletizing or tabletting, can advantageously be used.

In the case where the hydroisomerization catalyst contains at least one noble metal, the noble metal contained in said hydroisomerization catalyst can advantageously be reduced. One of the preferred methods for conducting the reduction of the metal is the treatment under hydrogen at a temperature of between 150° C. and 650° C. and a total pressure of between 1 and 250 bar. For example, a reduction consists of a plateau at 150° C. of two hours, and then an increase in temperature of up to 450° C. at the rate of 1° C./minute, and then a plateau of two hours at 450° C.; during this entire reduction stage, the hydrogen flow rate is 1,000 normal m$^3$ of hydrogen/m$^3$ of catalyst and the total pressure kept constant at 1 bar. Any ex-situ reduction method can advantageously be considered.

In the hydroisomerization stage, the feedstock is brought into contact, in the presence of hydrogen, with said hydroisomerization catalyst, at operating temperatures and pressures that advantageously make it possible to carry out a hydroisomerization of the non-converting feedstock. This means that hydroisomerization is performed with a conversion of the 150° C.+ fraction into a 150° C.− fraction of less than 20% by weight, in a preferred manner less than 10% by weight, and in a very preferred manner less than 5% by weight.

The hydroisomerization stage d) of the process according to the invention is advantageously performed at a temperature of between 300 and 380° C., preferably between 300 and 350° C., and in a more preferred manner between 300 and 340° C., at a pressure of between 3 MPa and 7 MPa, at an hourly volumetric flow rate of between 0.5 and 5 h$^{-1}$, and in the presence of a total quantity of hydrogen mixed with said hydrocarbon-based liquid fraction such that the hydrogen/hydrocarbon-based liquid fraction ratio is between 70 and 1,000 Nm$^3$/m$^3$.

In a preferred manner, the hydroisomerization stage is performed in co-current.

Stage e) for Separation of the Effluent Obtained from Stage d) into a Gaseous Fraction Comprising Hydrogen and into a Diesel-Fuel-Based Fraction.

In accordance with stage e) of the process according to the invention, at least a portion, preferably all, of the effluent obtained from stage d) is subjected to one or more separation stages for obtaining at least one gaseous fraction preferably comprising, for the most part, hydrogen and at least one diesel-fuel-based fraction.

The object of this stage is to separate the gases from the liquid, and in particular to recover a hydrogen-rich gas that can be recycled and at least one diesel-fuel-based fraction and optionally lighter compounds than the diesel fuel, such as contained in a kerosene fraction or a naphtha fraction. The upgrading of the naphtha fraction is not the object of this invention, but this fraction can advantageously be incorporated directly in the formulation of gasolines or be sent into a steam-cracking unit or a catalytic reforming unit. The upgrading of the kerosene fraction is not the object of this invention, but this fraction may advantageously be incorporated in the formulation of highway diesel fuel, jet diesel fuel A1, or fuel oil.

Treatment and Recycling of Separated Gaseous Fractions of Stages b) and e)

The separated gaseous fractions preferably essentially comprising hydrogen of stages b) and e) can be treated at least in part to reduce their contents of light products ($C_1$ to $C_4$) and/or impurities, such as CO and $CO_2$, before being sent back into the process according to the invention, i.e., into stages a) and/or d).

When the hydroisomerization catalyst used in stage d) comprises a noble metal, stage d) is implemented at least in part on the hydrocarbon-based liquid fraction that is obtained from stage c), and the gaseous fractions obtained at least in part from the separated gaseous fraction of stage b) and/or stage c) and/or stage e) and sent back to stage d) are subjected in advance to a stage for elimination of the hydrogen sulfide. The elimination of H2S can be done by any of the methods and techniques known to one skilled in the art, for example an amine washing.

It is also possible to introduce the hydrogen that is contained in the separated gaseous fraction of stage b) and/or stage e) with the feedstock that enters into stage a) and/or into stage d) and/or in the form of quenching hydrogen between the hydrotreatment and/or hydroisomerization catalyst beds. The same requirements according to the invention apply. It is also possible to introduce an addition of hydrogen to hydrotreatment stage a) and/or to hydroisomerization stage d).

Products that are Obtained

The diesel fuel bases that are produced according to the process of the invention have excellent characteristics that are satisfactory for use in marine fuels of distillate types or the incorporation thereof as fluxing agent in residual-type marine fuels. The diesel fuel bases that are produced according to the process have:

A sulfur content of less than 10 ppm by weight,
A content of total aromatic compounds of less than 5% by weight and a content of polyaromatic compounds of less than 2% by weight,
A cetane number of greater than 55,
A density of less than 840 kg/m$^3$, and most often less than 820 kg/m$^3$,
A kinematic viscosity at 40° C. of between 2 and 8 mm$^2$/s,
Cold strength properties that are compatible with the standards in force for the marine fuels, in particular a pour point of between −6° C. and +6° C.

DESCRIPTION OF THE FIGURES

The following embodiments are described by referring to the corresponding figures.

According to a first embodiment of the process according to the invention shown in FIG. 1, the feedstock that is obtained from renewable sources is allowed via the line (1) into the hydrotreatment zone (3) operating in the presence of make-up hydrogen and/or recycled hydrogen, with the hydrogen being brought in via the pipe (2). In the hydrotreatment zone (3), the feedstock is brought into contact with a hydrotreatment catalyst as described in the invention. The hydrotreated effluent is then sent directly via the pipe (4) into a hydroisomerization zone (9) that uses a hydroisomerization catalyst. The stream containing the hydrocarbon liquid fraction is introduced, as well as a stream of make-up hydrogen and/or recycled hydrogen via the pipe (5), into the hydroisomerization zone (9) containing the hydroisomerization catalyst. The thus hydroisomerized effluent is next sent via the pipe (10) into the separation zone (11) in such a way as to separate the gases evacuated via the pipe (12) from at least one diesel fuel fraction recovered by the pipe (13) and upgradable in the highway or air diesel fuel pool and/or at least one marine fuel pool. The quenching streams that are necessary for controlling temperatures (not shown), generally hydrogen-rich gases, can optionally be injected into the center of hydrotreatment and/or hydroisomerization zones.

An implementation similar to the one of FIG. 1 would consist in using the hydrotreatment and hydroisomerization catalysts in the same reactor, with the stream consisting of the feedstock and the hydrogen-rich gas thus first passing through a hydrotreatment catalytic bed and then a hydroisomerization catalytic bed.

Figure 2:
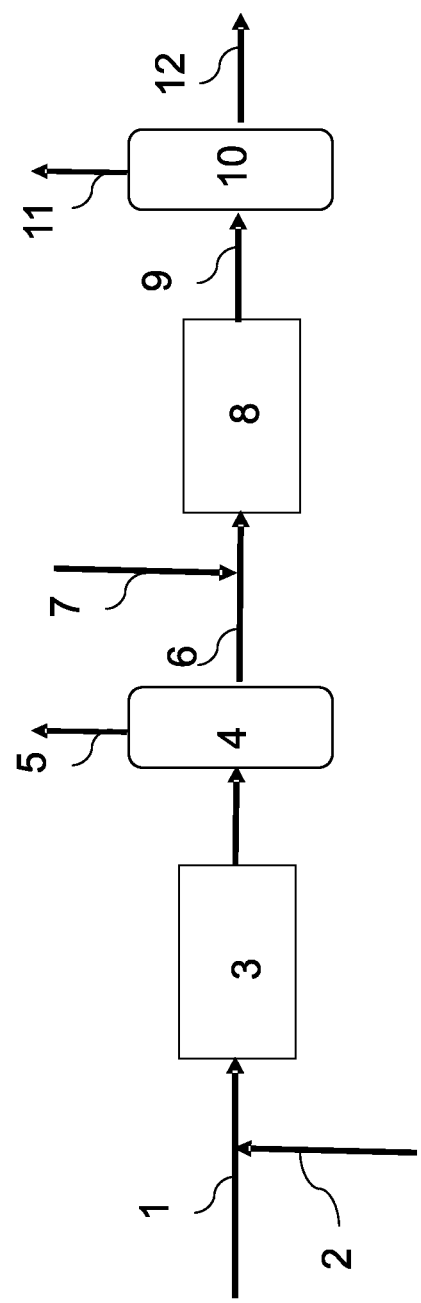
FIG. 2 illustrates the implementation of the process according to a second embodiment.

According to a second embodiment of the process according to the invention shown in FIG. 2, the feedstock that is obtained from renewable sources is allowed through the pipe (1) into the hydrotreatment zone (3) operating in the presence of make-up hydrogen and/or recycled hydrogen, with the hydrogen being brought in via the pipe (2). In the hydrotreatment zone (3), the feedstock is brought into contact with a hydrotreatment catalyst as described in the invention. The hydrotreated effluent is then introduced into a separation zone (4) in such a way as to separate the gases from the liquids. This separation zone (4) can consist of one or more separators (not shown) that may operate at different temperatures and pressures. The hydrogen-rich gases are recovered and evacuated via the pipe (5) before their optional treatment (not shown) making it possible to eliminate the impurities at least in part and in such a way as to recycle at least a portion of the hydrogen to the hydrotreatment and/or hydroisomerization zone (hydrogen recycling pipes not shown). The liquid hydrocarbon fraction is recovered and sent via the pipe (6) into a hydroisomerization zone (9) that uses the hydroisomerization catalyst. The hydrocarbon liquid fraction is introduced, as well as a stream of make-up hydrogen and/or recycled hydrogen via the pipe (7), into the hydroisomerization zone (9) containing the hydroisomerization catalyst described above. The thus hydroisomerized effluent is then sent via the pipe (10) into the separation zone (11) in such a way as to separate the gases that are evacuated via the pipe (12) from at least one diesel fuel fraction recovered by the pipe (13) and upgradable in the highway or air diesel fuel pool and/or at least one marine fuel pool. The quenching streams necessary for controlling temperatures (not shown), generally hydrogen-rich gases, can optionally be injected into the middle of the hydrotreatment and/or hydroisomerization zones.

Figure 3:
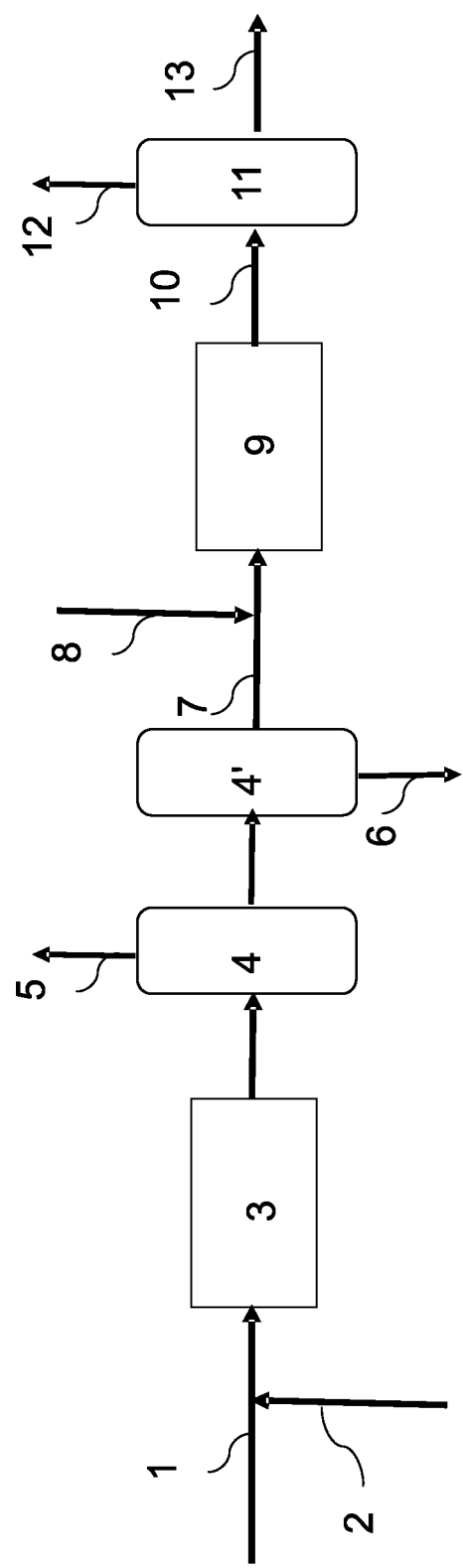
FIG. 3 illustrates the implementation of the process according to a third embodiment.

According to a third embodiment of the process according to the invention shown in FIG. 3, the feedstock that is obtained from renewable sources is allowed via the pipe (1) into the hydrotreatment zone (3) operating in the presence of make-up hydrogen and/or recycled hydrogen, with the hydrogen being brought in via the pipe (2). In the hydrotreatment zone (3), the feedstock is brought into contact with a hydrotreatment catalyst as described in the invention. The hydrotreated effluent is then introduced into a separation zone (4) in such a way as to separate the gases from the liquids. This separation zone (4) can consist of one or more separators (not shown) that can operate at different temperatures and pressures. The hydrogen-rich gases are recovered via the pipe (5) before an optional treatment (not shown) that makes it possible to eliminate the impurities at least in part and in such a way as to recycle at least a portion of the hydrogen toward hydrotreatment and/or hydroisomerization (hydrogen recycling pipes not shown). The separated liquid hydrocarbon fraction is sent from the separator(s) into at least one zone (4') for stripping the hydrogen sulfide that is dissolved in said liquid hydrocarbon fraction. The hydrogen-sulfide-rich gas fraction that is obtained from stripping carried out in the zone (4') is eliminated via the pipe (6). The liquid hydrocarbon fraction is recovered and sent via the pipe (7) into a hydroisomerization zone (9) using the hydroisomerization catalyst. According to FIG. 3, the hydrocarbon liquid fraction, as well as a stream of make-up hydrogen and/or recycled hydrogen, is introduced via the pipe (8) into the hydroisomerization zone (9) containing the hydroisomerization catalyst described above. The thus hydroisomerized effluent is then sent via the pipe (10) into the separation zone (11) in such a way as to separate the gases that are evacuated via the pipe (12) from at least one diesel fuel fraction recovered via the pipe (13) and upgradable in the highway or air diesel fuel pool and/or at least one marine fuel pool. The quenching streams that are necessary for controlling the temperatures (not shown), generally hydrogen-rich gases, optionally can be injected into zones 3 and 9 for hydrotreatment and/or hydroisomerization.

Example 1

Stage a): Hydrotreatment

Introduced into a reactor whose temperature is regulated in such a way as to ensure an isothermal functioning and with a fixed bed charged with 190 ml of hydrotreatment catalyst HR548™ based on nickel and molybdenum marketed by the Axens Company, with the catalyst being sulfurized in advance, is 170 g/h of pre-refined canola oil with a density of 920 kg/m$^3$, not containing aromatic compounds and having a sulfur content of less than 10 ppm by weight, with a cetane number of 35 and whose fatty acid composition is presented in detail below:

| Fatty Acid Glycerides | Nature of Fatty Chain | % by Mass |
|---|---|---|
| Palmitic | C16:0 | 4 |
| Palmitoleic | C16:1 | <0.5 |
| Stearic | C18:0 | 2 |
| Oleic | C18:1 | 61 |
| Linoleic | C18:2 | 20 |

| Fatty Acid Glycerides | Nature of Fatty Chain | % by Mass |
|---|---|---|
| Linolenic | C18:3 | 9 |
| Arachidic | C20:0 | <0.5 |
| Gadoleic | C20:1 | 1 |
| Behenic | C22:0 | <0.5 |
| Erucic | C22:1 | <1 |

700 Nm$^3$ of hydrogen/m$^3$ of feedstock is introduced into the reactor kept at a temperature of 300° C. and at a pressure of 5 MPa.

Stage b): Separation of the Effluent that is Obtained from Stage a)

The entire hydrotreated effluent that is obtained from stage a) is separated in such a way as to recover the hydrogen-rich gases and a liquid hydrocarbon base.

Stage d): Hydroisomerization of the Liquid Hydrocarbon Base that is Obtained from Stage b) on a Catalyst According to the Invention The effluent is hydroisomerized with lost hydrogen on the catalyst HDK776™ with an NiW base on amorphous alumina-silica marketed by the Axens Company, in a hydroisomerization reactor under the operating conditions below:

VVH (volume of feedstock/volume of catalyst/hour)=1.5 h$^{-1}$
Total working pressure: 5 MPa
Hydrogen/liquid hydrocarbon base ratio: 700 normal liters/liter The temperature of the hydroisomerization stage is adjusted in such a way as to obtain an effluent having particular cold properties (cf. Table 1) or a pour point in accordance with specifications (winter or summer) of a distillate-type marine fuel.

The hydroisomerized effluent is then characterized. The yields and the properties of the fractions are presented in Table 1.

TABLE 1

Characteristics of the Product

| | | | | | |
|---|---|---|---|---|---|
| Hydroisomerization Temperature (° C.) | 250 | 315 | 320 | 340 | 400 |
| 150° C.$^-$ Fraction (% by Weight) | 0 | 1 | 2 | 4 | 83 |
| 150° C.$^+$ Fraction (Diesel Fuel, % by Weight) | 100 | 99 | 98 | 96 | 17 |
| Product Quality of the 150° C.$^+$ Fraction | | | | | |
| Cetane Number (ASTMD613) | 105 | 85 | 80 | 77 | 59 |
| Pour Point (° C.) | 27 | −1 | −7 | −18 | −60 |
| Sulfur Content (ppm by Weight) | <5 | <5 | <5 | <5 | <5 |
| Flash Point (° C.) | 100 | 96 | 85 | 66 | 42 |

The process according to the invention therefore makes it possible to obtain a distillate-type marine fuel corresponding to the specifications in force (winter or summer) by means of a selection of particular operating conditions.

The entire disclosures of all applications, patents and publications, cited herein and of corresponding French Application No. 12/03491, filed Dec. 19, 2012 are incorporated by reference herein.

The invention claimed is:
1. Process for the production of diesel fuel bases comprising a sulfur content of less than 100 ppm, starting from a feedstock that is obtained from a renewable source, comprising the following stages:
- a) A stage for bringing the feedstock into contact with a fixed-bed hydrotreatment catalyst, at a temperature of between 200 and 450° C., at a pressure of between 1 MPa and 10 MPa, at an hourly volumetric flow rate of between 0.1 h$^{-1}$ and 10 h$^{-1}$ and in the presence of a total quantity of hydrogen mixed with the feedstock such that the hydrogen/feedstock ratio is between 150 and 750 Nm$^3$ of hydrogen/m$^3$ of feedstock for producing an effluent that comprises a gaseous fraction comprising hydrogen and a hydrocarbon-based liquid fraction,
- b) A stage where at least a portion of the effluent that is obtained from stage a) is subjected to separation into a gaseous fraction comprising hydrogen and a hydrocarbon-based liquid fraction,
- c) A stage where at least a portion of the separated hydrocarbon-based liquid fraction obtained from stage b) is subjected to elimination of hydrogen sulfide dissolved in said hydrocarbon-based liquid fraction before stage d),
- d) A stage for bringing into contact at least one portion of the hydrocarbon-based liquid fraction in the presence of a selective hydroisomerization catalyst in a fixed bed, said catalyst comprising at least one group VIII metal and/or at least group VIB metal, said stage d) being carried out at a temperature of between 300 and 380° C., at a pressure of between 3 MPa and 7 MPa, at an hourly volumetric flow rate of between 0.5 and 5 h$^{-1}$, and in the presence of a total quantity of hydrogen mixed with said hydrocarbon-based liquid fraction such that the hydrogen/hydrocarbon-based liquid fraction ratio is between 70 and 1,000 Nm$^3$/m$^3$,
- e) A stage for separating the effluent that is obtained from stage d) into a gaseous fraction that comprises hydrogen and at least one diesel-fuel-based fraction,
and in which the hydrogen that is used in stage a) and/or in stage d) is obtained at least in part from the separated gaseous fraction of stage e) and in part from the separated gaseous fraction of stage b).

2. Process according to claim 1, in which the hydrotreatment catalyst and/or the hydroisomerization catalyst comprise(s) sulfurized metals.

3. Process according to claim 2, in which a sulfur-containing compound, which by thermal decomposition produces hydrogen sulfide, is added to all of the liquid and/or gaseous streams upstream from stages a) and/or d).

4. Process according to claim 1, in which when the hydroisomerization catalyst used in stage d) comprises a group VIII and/or a group VIB noble metal, stage d) is implemented on at least in part the hydrocarbon-based liquid fraction that is obtained from stage c), and the gaseous fractions that are obtained at least in part from the separated gaseous fraction of stage b) and/or stage e) and sent back to stage d) are subjected in advance to a stage for elimination of hydrogen sulfide.

5. Process according to claim 1, in which stage a) is performed in the presence of a total quantity of hydrogen mixed with the feedstock such that the hydrogen/feedstock ratio is between 150 and 700 Nm$^3$ of hydrogen/m$^3$ of feedstock.

6. Process according to claim 1, in which the total content of metal oxides of groups VIB and VIII in the catalyst that is used in stage a) is between 5 and 40% by weight relative to the total mass of the catalyst.

7. Process according to claim 1, in which the feedstock contains vegetable oils and animal fats, containing triglycerides and fatty acids or esters, with hydrocarbon fatty chains having a number of carbon atoms of between 8 and 25.

8. Process according to claim 7, in which the feedstock contains contents of sulfur and nitrogen that are less than 500 ppm and contents of aromatic compounds that are less than 5% by weight.

9. Marine fuel obtained by the process according to claim 1.

10. Fluxing base for marine fuels, obtained by the process according to claim 1.

* * * * *